(No Model.)  3 Sheets—Sheet 2.
N. SEIBERT.
LUBRICATOR.
No. 465,679. Patented Dec. 22, 1891.
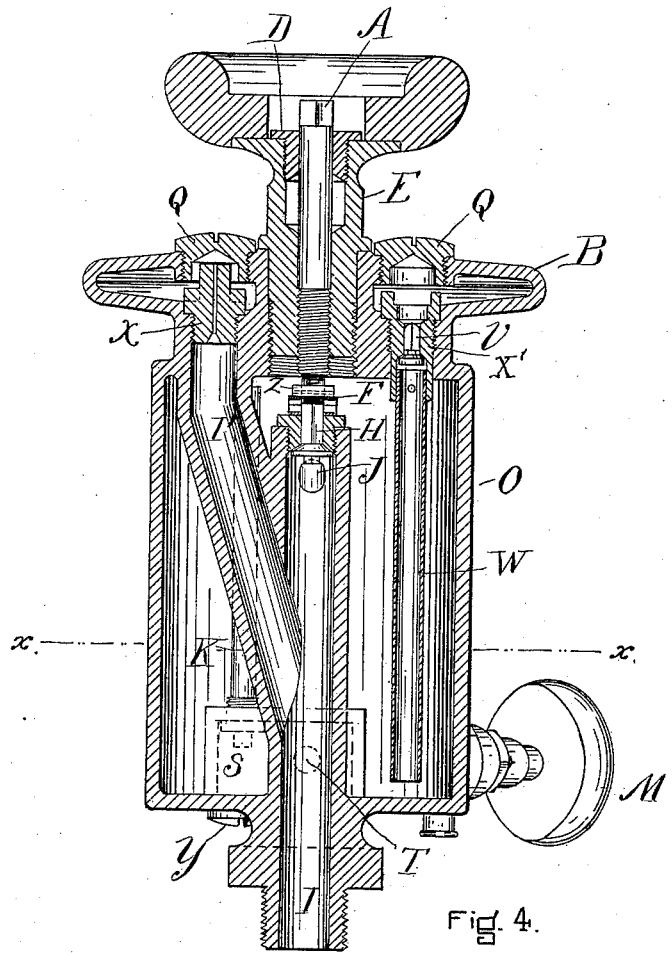
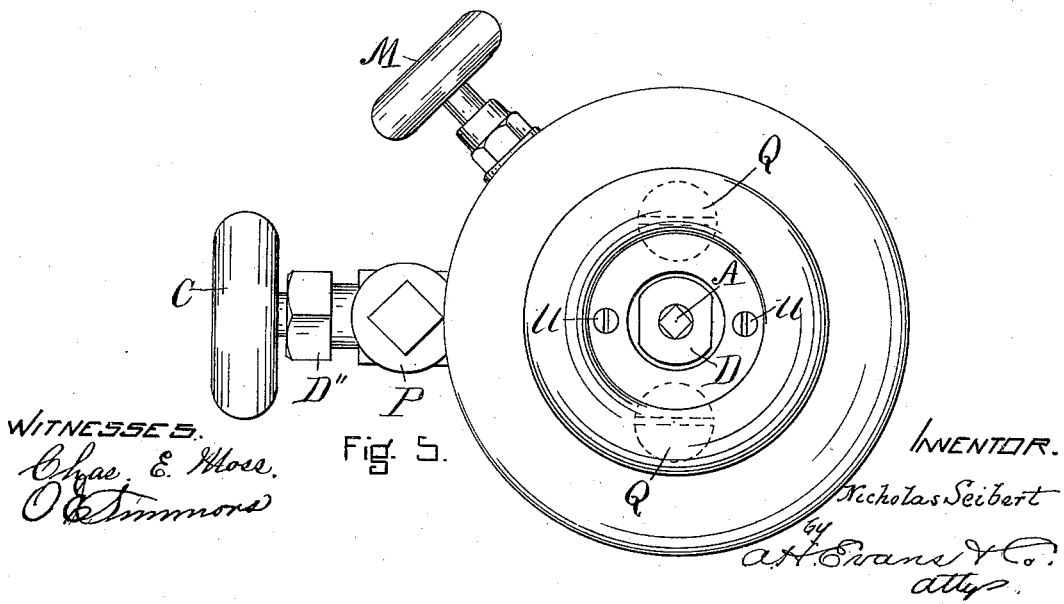
Fig. 5.
WITNESSES.
Chas. E. Moss
O. E. Timmons
INVENTOR.
Nicholas Seibert
by A. H. Evans & Co.
Attys.

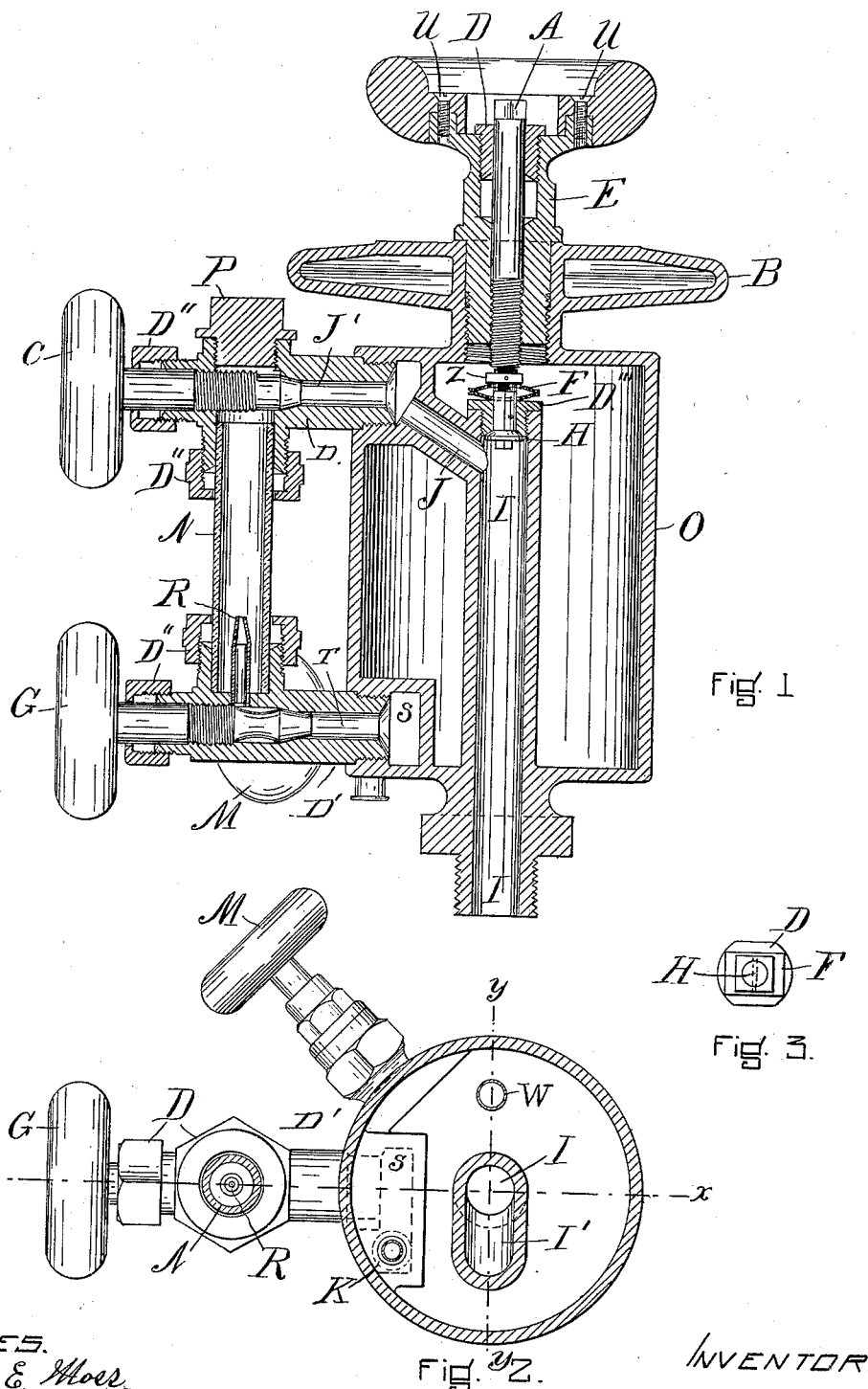

(No Model.)

N. SEIBERT.
LUBRICATOR.

No. 465,679.

3 Sheets—Sheet 3.

Patented Dec. 22, 1891.

WITNESSES.
Chas. E. Moss.
O. E. Simmons

INVENTOR.
Nicholas Seibert
by A. H. Evans & Co
attys.

UNITED STATES PATENT OFFICE.

NICHOLAS SEIBERT, OF MALDEN, MASSACHUSETTS.

LUBRICATOR.

SPECIFICATION forming part of Letters Patent No. 465,679, dated December 22, 1891.

Application filed February 19, 1891. Serial No. 382,073. (No model.)

*To all whom it may concern:*

Be it known that I, NICHOLAS SEIBERT, a citizen of the United States, residing at Malden, in the county of Middlesex and State of Massachusetts, have invented certain new and useful Improvements in Lubricators, as set forth in the accompanying drawings, forming part of this specification, in which—

Figure 6:
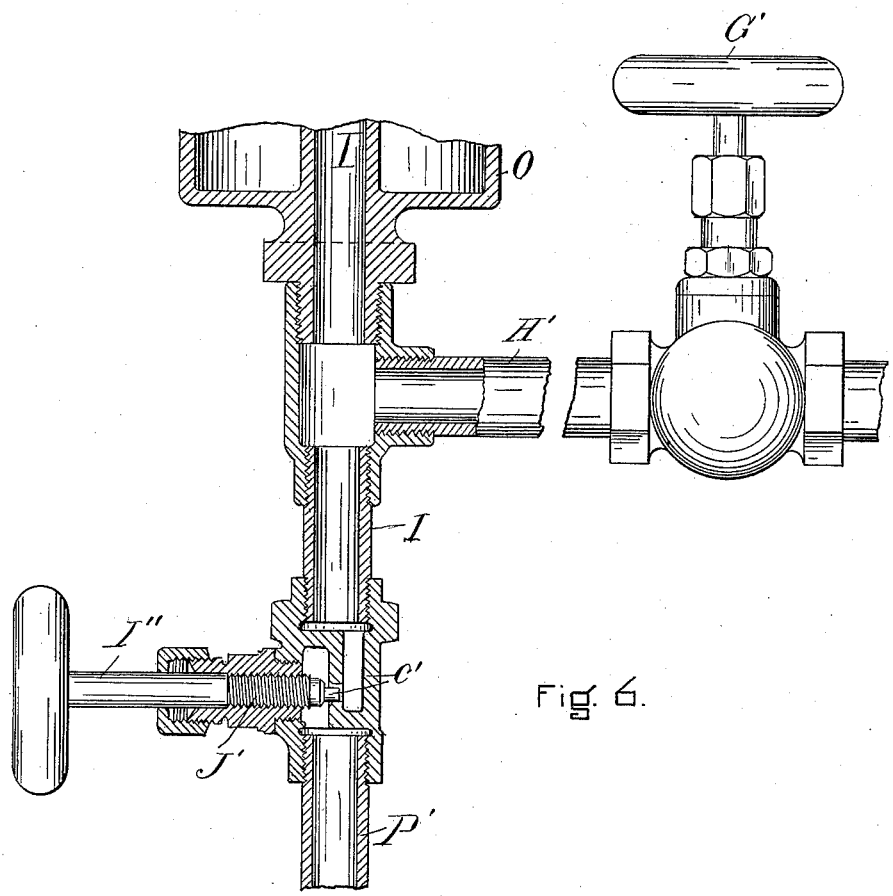
Figure 7:
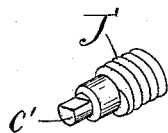

Figure 1 represents a vertical sectional view of a lubricator embodying my invention. Fig. 2 is a horizontal sectional view on the line $xx$ of Fig. 4. Fig. 3 is a detail showing in plan the elliptic spring, the plug D, and the auxiliary valve. Fig. 4 is a vertical sectional view on the line $yy$ of Fig. 2. Fig. 5 is a plan view of Fig. 1. Fig. 6 is a detail to be referred to. Fig. 7 is a detail of the inner end of the valve-stem J' with its cut-away extension or valve.

My invention relates to devices for lubricating the valves and other desired parts of a steam-engine or other machine; and it consists of the construction and combinations of devices which I shall hereinafter fully describe and claim.

The present improvements are particularly applicable to that class of lubricators known as "displacement" or "oil-feed" lubricators, such as is described and claimed in my former patents, No. 379,733 and No. 387,114, granted to me March 20, 1888, and July 31, 1888, respectively.

To enable others skilled in the art to which my invention appertains to make and use the same, I will now describe its construction and indicate the manner in which the same is carried out.

Referring now to the drawings for a more complete explanation of my invention, O represents an oil cup or reservoir provided with the usual condenser B, and through which is made an opening for the introduction of the lubricant to the reservoir, said opening being closed by the filling-plug E, to the top of which is fitted, by means of the screws U, the usual hand-wheel, by means of which the plug is removed and inserted.

In the center of the oil cup or reservoir and cast integral therewith is a pipe or tube, which forms a steam-chamber I, having a lateral upwardly-inclined extension I', while at about right angles thereto is a short pipe J, also cast integral with the oil-cup and the tube I, and connecting with a passage in the tube or pipe J', which contains the valve C for controlling the flow of oil to the steam-chamber.

The inspection-tube or gage-glass N is vertically disposed and has its upper end fitted to the pipe D and in communication with the valve-controlled passage therein, while its lower end is fitted to a pipe D', in which the feed-regulating valve G is mounted and properly seated, these pipes D and D' having screw-packing nuts D" and other accessories, and the pipe D having fitted in it a screw-plug P, as shown in Fig. 1. A short vertical tube R is fitted to the pipe D', so that its lower open end will be in communication with the passage in the said tube D', while its upper end is contracted and projects into the lower end of the gage-glass N.

In the bottom of the oil cup or reservoir is formed an oil-receptacle S, which communicates with the passage in pipe D' and from which the vertical oil-pipe K rises and extends to a point near the top of the oil-cup.

A plug X is screwed into the lower wall of the condenser at one side, so as to practically close the upper end of the branch I' of the steam-chamber I, and said plug has a small opening made through it for the passage of the steam from the steam-chamber to the condenser, while on the opposite side of the condenser another screw-plug X' is fitted and adapted to contain an upwardly-closing check-valve V, controlling the entrance to the water-pipe W, depending from the plug.

Q Q represent screw-plugs fitted to the condenser over the screw-plugs X X', so that access may be had to said plugs without difficulty, and Y is a screw-plug in the bottom of the oil-cup, closing the opening through which the oil-pipe K is introduced.

M represents any well-known form of waste-valve mounted in the base of the oil-cup in any desired manner.

In order that my lubricator may have an auxiliary feed to insure the oiling of the parts, when by reason of accident or otherwise the passage of the lubricant through the gage-tube N is prevented—as, for instance, when the glass-tube is broken—I suitably seat in the filling-plug E the stem A of the auxiliary feed mechanism, while in the top of the steam-chamber I is fitted a screw-nut D''', formed with a valve-seat for the vertically-moving auxiliary valve H, whose stem passes through the screw-nut and through suitable curved spring-plates which form the elliptical spring F, as shown in Fig. 1. The upper end of the valve H is threaded and receives a nut Z, which bears upon the spring F, and thereby causes the spring to hold the valve closely against its seat, and the lower end of the stem A bears against the stem of the valve H to open said valve and to maintain the same in an open position as long as the circumstances require.

In Fig. 6 I illustrate a portion of the oil-cup with its steam-chamber I and a pipe H', conveying steam thereto from the boiler of the engine and controlled by a valve G'. To hold the steam in check in the pipe or steam-chamber I, a valve I'' is fitted in the pipe I, and has its inner end reduced in size and cut away at one side to form a passage leading to a pipe P', which conveys the lubricant to the valves of the engine.

The operation of the device as previously described is substantially as follows: The oil-cup is first filled with tallow, oil, or other lubricating material and the filling-plug firmly screwed in place. The valve G' is now opened to admit steam, which enters the steam-chamber I through pipe H'. The steam passes from the steam-chamber through its branch I' and the opening in the plug X into the condenser and will displace the water of condensation therein, causing a portion of it to flow through the check-valve V and water-pipe W to the bottom of the oil-cup, displacing an equal amount of oil and causing it to enter and flow down the pipe K to the oil-receptacle S in the bottom of the oil-cup. The valves C and G being now opened, a little the oil will pass into the passage T by the valve G and into the tube R, from which it discharges in the form of drops, which float upwardly through the water in the gage N and into and through the passage J to the steam-chamber I, in which the boiler-pressure is always uniform. The valve I'' (see Figs. 6 and 7) is now turned slightly to open communication between the steam-chamber I and pipe P', into which latter the oil passes and is conveyed to the valves or other working parts of the engine in the well-known manner. The valve I'' when once adjusted needs no further attention and remains open to provide for a uniform lubricating of those parts of the engine to which the pipe P' leads.

The auxiliary valve and its connections, which are employed in the event of the breakage of the glass gage-tube N, operate as follows: When it is discovered that the gage-tube N is broken, the valves C and G are closed and the stem A is turned (by a wrench or otherwise) to cause its lower end to press down the stem of the valve H, depressing the spring F and opening the auxiliary valve H, thereby admitting steam from the steam-chamber I into the oil cup or reservoir. The inflowing steam condenses and displaces an equal amount of oil, which enters the tube or steam-chamber I, and, passing to the bottom thereof, is finally conducted by the pipe P' to the valves of the engine. This auxiliary valve H also acts as a relief-valve in case of over-pressure from within the oil cup or reservoir, which may occur upon filling the same with cold oil and then turning on the steam through the steam-pipe H'. This action would result in the expanding of the oil and the closing of the check-valve V in the water-pipe W; but as the auxiliary valve would be opened by the expanding of the oil the pressure is relieved and all danger or damage to the lubricator is avoided.

Having thus described my invention, what I claim as new, and desire to secure by Letters Patent, is—

1. In a lubricator, the oil cup or reservoir having a gage-tube and internal steam-chamber and valve-controlled oil ducts or conduits for conveying the oil from the reservoir to said steam-chamber, in combination with an auxiliary valve seated upon and normally closing the upper end of the steam-chamber and a stem bearing upon the valve to open it and permit the oil to flow directly from the reservoir to the steam-chamber, substantially as herein described.

2. In a lubricator, the oil-reservoir having an internal steam-chamber and valve-controlled passages for directing the oil from the reservoir to the chamber, in combination with a valve seated upon and normally closing the upper end of the steam-chamber, and means for moving the valve to open direct communication between the oil-reservoir and top of the steam-chamber when the oil-passages are obstructed, substantially as herein described.

3. In a lubricator, the oil cup or reservoir having a gage-tube through which the displaced oil passes, a valve-controlled inlet to said tube, and a valve-controlled outlet therefrom, in combination with a steam-chamber within the oil cup or reservoir in communication with said outlet, and an auxiliary valve seated upon the upper open end of the steam-chamber, controlling the passage or communication between the steam-chamber and interior of the oil cup or reservoir and forming an escape-passage between the same when the passage through the gage-tube is closed, substantially as herein described.

4. In a lubricator, the oil cup or reservoir having a steam-chamber within it, a gage-tube, a valve-controlled conduit leading thereto from the oil cup or reservoir, and a valve-controlled conduit leading from said tube to the steam-chamber, in combination with an auxiliary valve mounted in the steam-chamber, a spring acting against the stem of said valve for normally closing the valve, a stem A, adapted to bear upon the valve-stem to open the valve and provide a passage between the interior of the steam-chamber, and a valve-controlled passage from said chamber to the parts to be lubricated, substantially as herein described.

5. In a lubricator, an oil cup or reservoir provided with a removable filling-plug, an internal steam-chamber, and valve-controlled conduit for conducting the lubricant from the reservoir to the steam-chamber, in combination with a stem mounted in the filling-plug, an auxiliary valve mounted in the steam-chamber and adapted to be actuated by said stem, and a spring acting upon the stem of the valve, substantially as herein described.

6. In a lubricator, the combination of the oil-reservoir, the internal steam-chamber integral therewith and provided with the lateral branches I' and J, lying in planes which are at right angles to each other, a condenser connecting with the branch I' and the valve-controlled oil-conduits from the reservoir connecting with the branch J, a communication between the condenser and oil-reservoir, a valve normally closing the upper end of the steam-chamber, and means for moving the same to open direct communication between the steam-chamber and reservoir when the usual oil-passages are obstructed, substantially as herein described.

NICHOLAS SEIBERT.

Witnesses:
O. E. SIMMONS,
W. C. HUNTING.